United States Patent
Walkingshaw et al.

(10) Patent No.: US 10,662,869 B2
(45) Date of Patent: May 26, 2020

(54) EXHAUST GAS GUIDE FOR AN EXHAUST GAS TURBOCHARGER AND METHOD FOR OPERATING AN EXHAUST GAS TURBOCHARGER

(71) Applicant: IHI Charging Systems International GmbH, Amt Wachsenburg OT Ichtershausen (DE)

(72) Inventors: Jason Walkingshaw, Heidelberg (DE); Tobias Scheuermann, Dossenheim (DE); Georgios Iosifidis, Heidelberg (DE); Manfred Guthörle, Neckarbischofsheim (DE)

(73) Assignee: IHI Charging Systems International GmbH, Amt Wachsenbur (DE)

( * ) Notice: Subject to any disclaimer, the term of this patent is extended or adjusted under 35 U.S.C. 154(b) by 16 days.

(21) Appl. No.: 15/773,867

(22) PCT Filed: Dec. 6, 2016

(86) PCT No.: PCT/EP2016/002049
§ 371 (c)(1),
(2) Date: May 4, 2018

(87) PCT Pub. No.: WO2017/108160
PCT Pub. Date: Jun. 29, 2017

(65) Prior Publication Data
US 2019/0072030 A1 Mar. 7, 2019

(30) Foreign Application Priority Data
Dec. 21, 2015 (DE) .......................... 10 2015 122 355

(51) Int. Cl.
*F02B 37/18* (2006.01)
*F01D 17/10* (2006.01)
*F02B 37/02* (2006.01)

(52) U.S. Cl.
CPC .......... *F02B 37/183* (2013.01); *F01D 17/105* (2013.01); *F02B 37/025* (2013.01);
(Continued)

(58) Field of Classification Search
CPC .... F01D 17/105; F02B 37/025; F02B 37/183; F05D 2220/40; F05D 2260/606; Y02T 10/144
See application file for complete search history.

(56) References Cited

U.S. PATENT DOCUMENTS 3,144,876 A 8/1964 Frye
3,511,475 A 5/1970 Pfau
(Continued)

FOREIGN PATENT DOCUMENTS

DE 3836723 C1 6/1989
DE 19824913 A1 12/1999
(Continued)

*Primary Examiner* — Brandon D Lee
(74) *Attorney, Agent, or Firm* — Smartpat PLC (57) ABSTRACT

An exhaust gas guide section for an exhaust gas turbocharger includes an actuator (1) with a wastegate (9) for opening and closing a bypass channel (31) of the exhaust gas guide section (1), wherein the bypass channel (31) is provided in the exhaust gas guide section (1) that can be flowed through to bypass a turbine wheel of the exhaust gas guide section (1) which is rotatably arranged in the exhaust gas guide section (1) in a wheel chamber of the exhaust gas guide section (1), and wherein the bypass channel (31) has a second flow cross section (33).

7 Claims, 8 Drawing Sheets

(52) U.S. Cl.
CPC .... *F05D 2220/40* (2013.01); *F05D 2260/606* (2013.01); *Y02T 10/144* (2013.01)

(56) References Cited

U.S. PATENT DOCUMENTS

| | | | |
|---|---|---|---|
| 4,794,758 A | 1/1989 | Nakazawa et al. | |
| 4,969,445 A | 11/1990 | Hertweck et al. | |
| 5,044,604 A | 9/1991 | Topham et al. | |
| 5,947,152 A | 9/1999 | Martin et al. | |
| 6,250,079 B1 * | 6/2001 | Zander | F02B 37/025 60/602 |
| 8,096,754 B2 | 1/2012 | Naemura et al. | |
| 8,820,709 B2 | 9/2014 | Lombard et al. | |
| 8,984,880 B2 | 3/2015 | Marques et al. | |
| 9,200,532 B2 | 12/2015 | Palaniyappan et al. | |
| 9,885,278 B2 | 2/2018 | Dilalan et al. | |
| 2007/0119170 A1 | 5/2007 | Masson et al. | |
| 2009/0139229 A1 | 6/2009 | Frantzheld et al. | |
| 2011/0173974 A1 * | 7/2011 | Grabowska | F01D 17/105 60/602 |
| 2011/0175025 A1 | 7/2011 | Schall | |
| 2012/0222419 A1 | 9/2012 | Hittle et al. | |
| 2012/0292547 A1 | 11/2012 | Kierat et al. | |
| 2012/0312010 A1 * | 12/2012 | Yasoshima | F01D 17/105 60/602 |
| 2014/0174077 A1 | 6/2014 | Palaniyappan et al. | |
| 2015/0014564 A1 | 1/2015 | Nagayo et al. | |
| 2015/0125273 A1 | 5/2015 | Tschirschke | |
| 2016/0178028 A1 | 6/2016 | Lummer et al. | |
| 2016/0341109 A1 * | 11/2016 | Lummer | F02B 37/025 |
| 2018/0328217 A1 | 11/2018 | Walkingshaw et al. | |
| 2019/0072030 A1 | 3/2019 | Walkingshaw et al. | |
| 2019/0136752 A1 | 5/2019 | Burmester et al. | |

FOREIGN PATENT DOCUMENTS

| | | |
|---|---|---|
| DE | 69814660 | 4/2004 |
| DE | 102010007600 A1 | 8/2011 |
| DE | 112009002230 | 9/2011 |
| DE | 102010043147 A1 | 10/2011 |
| DE | 112013002306 | 2/2015 |
| DE | 102015011256 A1 | 3/2016 |
| DE | 102015209044 A1 | 11/2016 |
| EP | 2444626 A1 | 4/2012 |
| EP | 2444625 | 11/2014 |
| FR | 2864994 A1 | 7/2005 |
| WO | 2005073536 A1 | 8/2005 |
| WO | 2007147513 A1 | 12/2007 |
| WO | 2010039596 A3 | 6/2010 |

* cited by examiner

EXHAUST GAS GUIDE FOR AN EXHAUST GAS TURBOCHARGER AND METHOD FOR OPERATING AN EXHAUST GAS TURBOCHARGER

TECHNICAL FIELD

The invention relates to an exhaust gas guide section for an exhaust gas turbocharger having a wastegate.

BACKGROUND

Exhaust gas guide sections for exhaust gas turbochargers which comprise an actuator for regulating a fluid flowing though the exhaust gas guide section, generally exhaust gas, are known. The actuator is intended for opening and closing of a bypass duct in the through-flow exhaust gas guide section for bypassing a turbine wheel of the exhaust gas guide section, which is rotatably arranged in the exhaust gas guide section in a wheel chamber of the exhaust gas guide section. It comprises a wastegate for opening and closing of a flow cross section of the bypass duct. By means of such an actuator, it is possible to completely or partially bypass the turbine wheel in certain operating points of the exhaust gas turbocharger, in particular in operating points which exhibit large flow volumes so that an efficient operation of the exhaust gas turbocharger is made possible. The efficient operation of the exhaust gas turbocharger is dependent on a certain opening characteristic of the actuator, which is to be adapted to the requirements of a combustion engine which is connected with the exhaust gas turbocharger.

DE 198 24 913 A1 discloses an exhaust gas guide section for an exhaust gas turbocharger with an actuator, whose opening characteristic exhibits a progressive course. Depending on a travel of the wastegate of the actuator, an opening cross section of a bypass duct of the exhaust gas guide section progressively increases, in particular exponentially, with increasing travel starting from a closed position. Thus, a progressive opening characteristic is given which is suited for the described application.

WO 2010/039596 A2 also discloses an exhaust gas guide section for an exhaust gas turbocharger with an actuator, whose wastegate exhibits a progressive opening characteristic, starting from a closed position of the wastegate.

SUMMARY

An object of the present invention is to provide an improved exhaust gas guide section for an exhaust gas turbocharger. It is another object to specify a method for operating an exhaust gas turbocharger.

This object is solved by an exhaust gas guide section for an exhaust gas turbocharger as disclosed in this specification.

According to the invention, an exhaust gas guide section for an exhaust gas turbocharger comprises an actuator with a wastegate for opening and closing a bypass duct of the exhaust gas guide section. The bypass duct is provided in the through-flow exhaust gas guide section for bypassing a turbine wheel which is rotatably arranged in a wheel chamber of the exhaust gas guide section and comprises a second flow cross section. The second flow cross section may be degressively opened by means of the wastegate into an open position, at least starting from a closed position. Contrary to the previous findings of the prior art, which prefer a progressive opening of the second flow cross section, a degressive opening of the second flow cross section into an open position, starting from a closed position, has proven to be advantageous. The advantage of degressive opening is an improved controllability of the exhaust gas turbocharger, which is associated with an improved response behaviour of the exhaust gas turbocharger. In addition, the degressive opening provides improved adjusting possibilities with further possible flow cross sections to be opened and/or closed, e.g. a flow cross section of a flooding connection.

In an embodiment of the inventive exhaust gas guide section, a first spiral channel and a second spiral channel for the inflow to a turbine wheel are formed in the exhaust gas guide section, with a through-flow opening being provided between the first spiral channel and the second spiral channel, which is formed for inducing an overflow of exhaust gas from the first spiral channel into the second spiral channel and vice versa and wherein the through-flow opening comprises a movable valve for opening or closing the through-flow opening. The advantage is the possibility to not exclusively guide the exhaust gas around the turbine wheel, but the exhaust gas may be guided from one spiral channel to the other one and vice versa, in particular in medium and high load and speed ranges of a mechanically and thermodynamically connected combustion engine. It is in these operating ranges that the turbine wheel is subjected to a virtually dynamic pressure. Thus, in the exhaust gas guide section which comprises the first spiral channel and the second spiral channel, each in the form of a usual partial spiral channel wherein wrapping of the spiral channel about a longitudinal axis of the exhaust gas guide section covers only 180°, a wrap around 360° may be provided. Thus, a smaller and more compact exhaust gas guide section may be formed. This leads to a further enhancement of the efficiency which may be achieved during operation of the exhaust gas turbocharger.

In another embodiment of the inventive exhaust gas guide section, the wastegate is configured to degressively open the second flow cross section starting from a closed position into an intermediate position. As in the case of overflow of the turbine wheel, it was found that a degressive opening of the second flow cross section during the so-called flowing around or bypassing, respectively, is advantageous for the application of the exhaust gas to the turbine wheel. The opening of the second flow cross section need not mandatorily be effected completely degressively, i.e. starting from the closed position into a second position, in which the second flow cross section is fully open. Thereby, the advantage of an improved controllability of the first flow cross section and of the second flow cross section is given.

A significant advantage of a combination of the degressive opening of the first flow cross section and of the second flow cross section is to be seen in that during operation with the combustion engine, a valve opening time of an outlet valve of the combustion engine may be advantageously extended. This may extend a charge changing phase of the combustion engine for improved purging.

Preferably, the valve or the wastegate, respectively, may be moved by means of an actuator. It is also conceivable to form a self-regulating valve which automatically opens or closes by means of pressures applied in the spiral channels. However, a controllable regulation of the valve by means of the actuator is to be preferred, because this allows to actively influence the pressure ratio at the turbine wheel. Most preferably, the actuator of the valve corresponds to the actuator of the wastegate. This enables the movement of the valve and of the wastegate by means of a single actuator, which again enables a compact construction of the exhaust gas turbocharger. A further advantage is a cost-efficient manufacture of the exhaust gas turbocharger due to a smaller number of components.

In a preferred embodiment, a movement of the wastegate triggers a movement of the valve. Therefore, the opening of the first flow cross section and of the second flow cross section can be directly influenced by a movement of the wastegate. This means in other words that the movement of the valve may be represented as a function of the movement of the wastegate. This results in a simplified regulation of the two flow cross sections, e.g. in the case of a computer-controlled regulation of the flow cross sections.

For a further compact construction of the exhaust gas turbocharger, the valve corresponds to the wastegate. In other words, this means that both the first flow cross section and the second flow cross section may be opened and closed by means of one element only. In addition to a compact construction, this leads to a cost efficient manufacture of the exhaust gas turbocharger, because the number of parts of the assembly is reduced.

In order to achieve a degressive opening characteristic, the wastegate and/or the valve preferably comprises a pot-shaped outer contour. Such an outer contour provides in a simple manner a relatively large through-flow flow cross section already at the beginning of the opening, starting from the closed position of the wastegate and/or of the valve, which increases degressively over a certain travel of the wastegate and/or of the valve.

In another embodiment, the wastegate and/or the valve comprises a first element portion along its longitudinal axis and a second element portion, wherein a first angle of inclination of a first outer surface of the first element portion is greater than a second angle of inclination of a second outer surface of the second element portion for obtaining a degressive opening characteristic, wherein the second element portion is arranged opposite a second channel wall. The degressive opening characteristic is easily achievable by means of the two element portions. The wastegate and/or the valve may be manufactured in a simple process.

For sealing the first flow cross section or the second flow cross section, respectively, in the closed position of the wastegate and/or of the valve, the wastegate and/or the valve is provided with an annular surface which bears against a channel wall of the exhaust gas guide section. In addition, it is advantageous to place the ring of the valve within the bypass duct. Thereby, the valve is opened more easily by means of the amount of exhaust gas flowing through the bypass duct.

In another embodiment of the inventive exhaust gas guide section, the wastegate and/or the valve are mounted at a lever arm of the actuator, which may be swivelled about an axis of rotation. Due to the possible rotational motion, relatively small actuation forces are required for moving the respective element.

In another embodiment of the inventive exhaust gas guide section, the valve is configured to open the first flow cross section after the at least partially opened second flow cross section. This is advantageous in that overflow from the first spiral channel and the second spiral channel is possible only after the bypass duct has already opened. This makes it possible to avoid knocking of the combustion engine due to an excessive exhaust gas backpressure at the turbine wheel. At the same time, a potential reverse flow of overflowing exhaust gas into the spiral channel is prevented, whose thermodynamically connected cylinders are in an intake and/or combustion phase of a cyclic process of the combustion engine. In other words, whose outlet valve or outlet valves, respectively, are closed while the outlet valves or the outlet valve, respectively, of the cylinders which are connected with the other spiral channel are open.

In another embodiment, the wastegate and/or the valve are configured so that they may at least partially accommodate a wall of the exhaust gas guide section and/or vice versa. This ensures that in the closed position of the wastegate there is no overflow from one spiral channel into the other one, or that in the closed position of the valve, respectively, there is no flow-off into the bypass duct. Furthermore, it may be ensured, in particular when the valve is formed like the wastegate that e.g. the second flow cross section is opened before the first flow cross section, if this is required by a current operation of the combustion engine.

The second aspect of the invention relates to a method for operating an exhaust gas turbocharger with a through-flow exhaust gas guide section, wherein in the exhaust gas guide section a bypass duct is formed for bypassing a turbine wheel which is rotatably supported in the exhaust gas guide section. The bypass duct comprises a second flow cross section which is to be opened and closed by means of a wastegate. The second flow cross section is degressively opened, starting from a closed position of the wastegate, in which the second flow cross section is completely closed.

By means of the inventive method a particularly efficient operation of the exhaust gas turbocharger combined with the combustion engine may be achieved. The inventive method allows the operation of the combustion engine with longer opening times of the outlet valve of the combustion engine. This may improve a charge change of the combustion engine due to a possible reduction of the exhaust gas backpressure in respect of a decrease of the so-called push-out work. Because longer opening times of the outlet valve of the combustion engine may be used at an enhanced efficiency of the combustion engine, a combustion engine exhibiting reduced consumption and thus emissions may be provided. In addition, the knocking tendency is considerably reduced.

Further advantages, features and details of the invention result from the following description of preferred exemplary embodiments as well from the drawing. The features and feature combinations as previously mentioned in the description as well as the features and feature combinations which will be mentioned in the following description of the figures and/or which are solely illustrated in the figures are not only applicable in the respective indicated combination but also in other combinations or isolated, without deviating from the scope of the invention. Identical reference numbers are assigned to equal or functionally equal elements.

DETAILED DESCRIPTION

Figure 1:
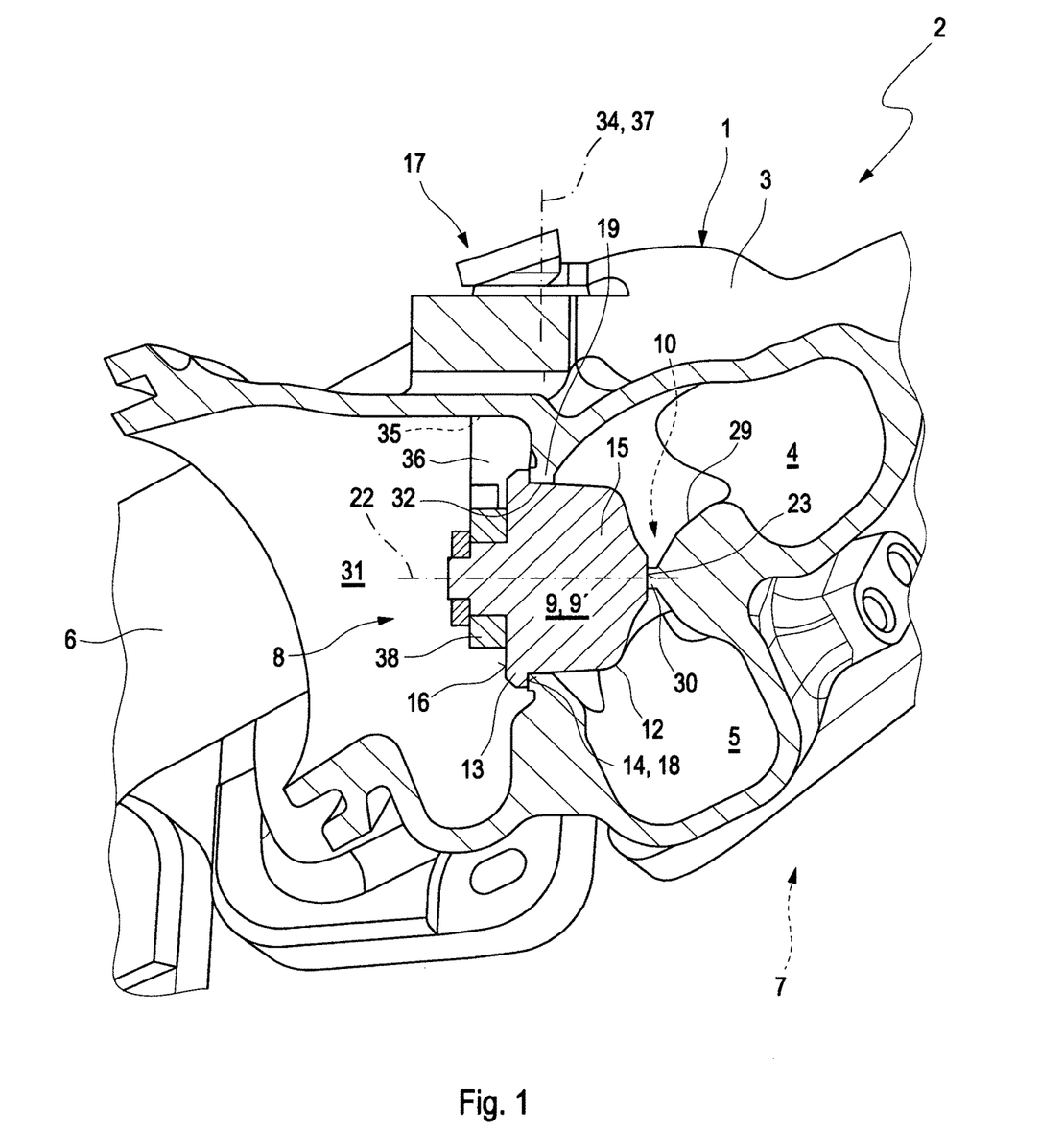
FIG. 1 shows in a perspective view a section along a first sectional plane through an inventive exhaust gas guide section for an exhaust gas turbocharger.

An inventive through-flow exhaust gas guide section 1 of an exhaust gas turbocharger 2 configured according to FIG. 1 comprises an inlet duct 3 for a fluid flow into the exhaust gas guide section 1, generally exhaust gas of a combustion engine 7, a first spiral channel 4 and a second spiral channel 5 downstream of the inlet duct 3 for conditioning of the flow and an outlet duct (not shown in detail) downstream of the spiral channels 4, 5, via which the exhaust gas may be discharged in a controlled manner from the exhaust gas guide section 1. Between the spiral channels 4, 5 and the outlet duct a wheel chamber (not shown in detail) is formed, in which a turbine wheel (not shown in detail) is rotatably accommodated.

The exhaust gas guide section 1 is connected with an exhaust gas manifold 6 of the combustion engine 7 so that the exhaust gas from the combustion engine 7 may enter the spiral channels 4, 5 via the inlet duct 3 to be applied to the turbine wheel.

For adapting the operational behavior of the exhaust gas turbocharger 2 to the fluid flow of the combustion engine, and thus to the combustion engine, an actuator 8 for disconnecting and connecting the first spiral channel 4 and the second spiral channel 5 is arranged in the exhaust gas guide section 1. For disconnecting and for connecting the two spiral channels 4, 5 a valve 9' of the actuator 8 is arranged in a through-flow opening 10 which is formed to provide a through-flow through the two spiral channels 4, 5.

In a first position, the closed position of the valve 9' as shown in FIG. 1, a through-flow through the two spiral channels 4, 5 is effected completely separate from one another, with the through-flow opening 10 being completely closed by means of the valve 9'. The exhaust gas from the combustion engine flows through the two spiral channels 4, 5, with a first portion of the exhaust gas flowing through the first spiral channel 4 and a second portion of the exhaust gas flowing through the second spiral channel 5.

Figure 2:
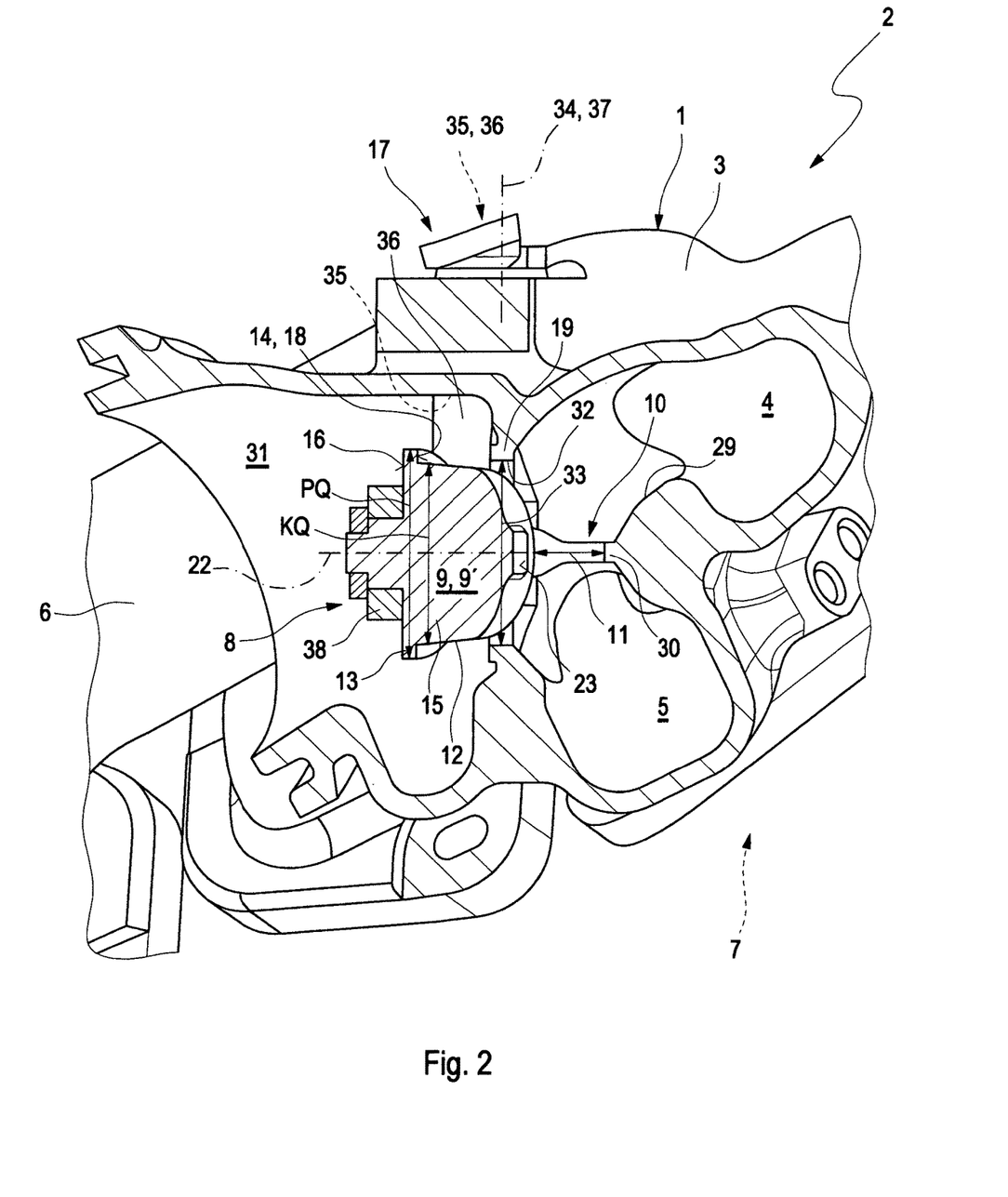
FIG. 2 shows the exhaust gas guide section according to FIG. 1 with the actuator in a second position.
Figure 3:
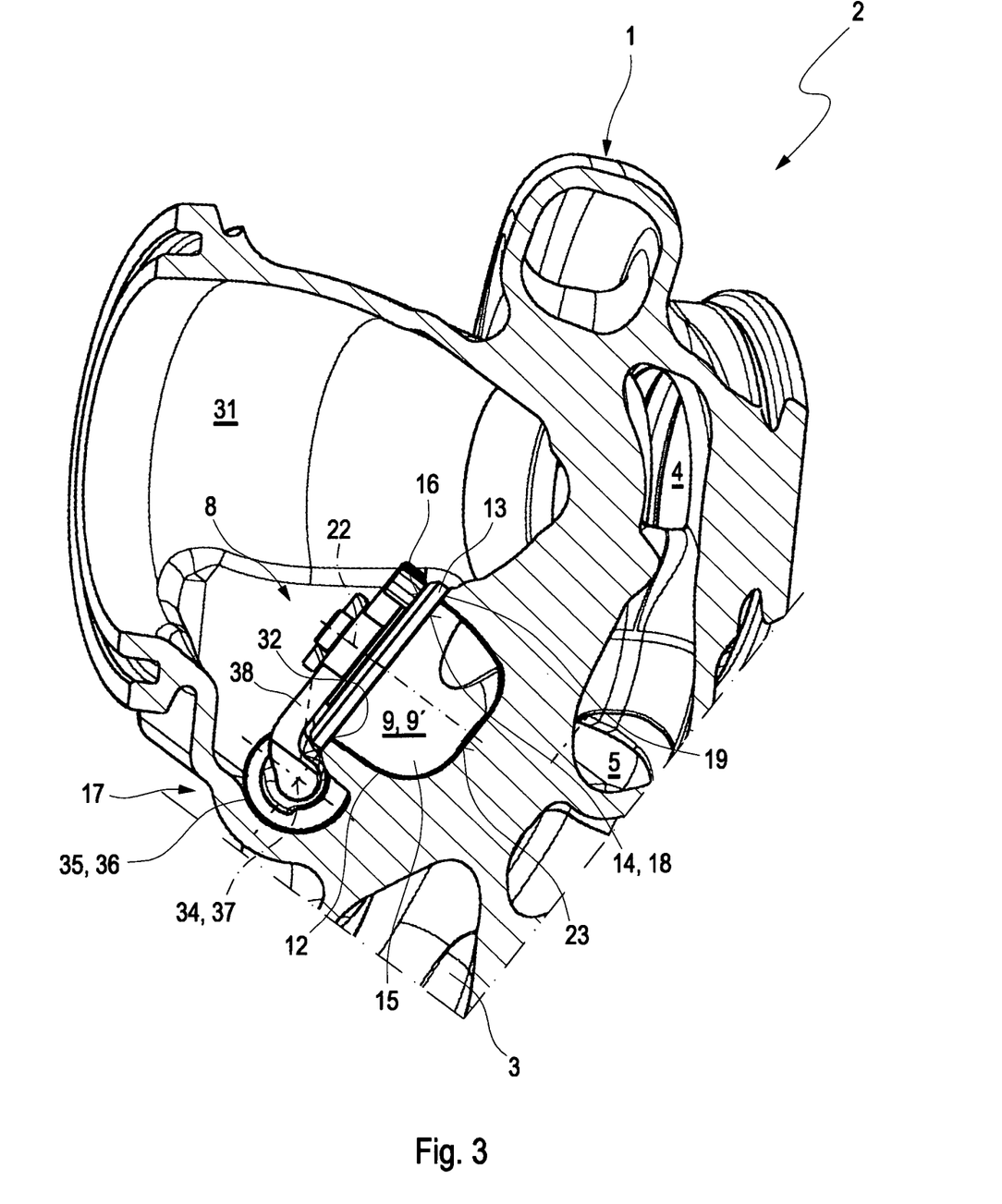
FIG. 3 shows in a perspective view a section along a second sectional plane through the inventive exhaust gas guide section according to FIG. 1 with the actuator in the first position.

In a second position of the valve 9' as shown in FIG. 2, the through-flow opening 10 is completely opened and exhaust gas may overflow from the first spiral channel 4 into the second spiral channel 5 and vice versa. This means that exhaust gas may overflow from the one spiral channel 4; 5 into the other spiral channel 5; 4 via the through-flow opening 10 which has a first flow cross section 11.

The valve 9' is to be positioned in further intermediate positions between the first position and the second position so that the first flow cross section 11 may be adapted to a relevant requirement for achieving an optimum efficiency of the exhaust gas turbocharger 2 in relation to the quantity of the exhaust gas flowing through. It was found that a degressive opening of the first flow cross section 11 starting from the first position, i.e. from the completely closed first flow cross section 11, towards the second position, and thus towards a completely opened first flow cross section 11, is advantageous. In other words, the valve 9' is formed for inducing a degressive opening of the first flow cross section 11. This means that the actuator 8 exhibits a degressive opening characteristic for opening of the first flow cross section 11.

For inducing the degressive opening of the first flow cross section 11, the valve 9' is configured to form a pot-shaped outer contour 12. It comprises a base plate 13 which accommodates an element body 15 at a first plate surface 14. An actuating device 17 of the actuator 8 is fixed at the base plate 13 on a second plate surface 16 opposite the element body 15.

The element body 15 has a body basic cross section KQ which is smaller than a plate cross section PQ of the first plate surface 14. Thereby, an annular surface 18 is formed which completely surrounds the element body 15. This annular surface 18 serves to support the valve 9' against a first channel wall 19 of the through-flow opening 10, on the one hand, and, on the other hand, as a sealing surface for sealing the two spiral channels 4, 5 in the first position of the valve 9'.

For achieving the degressive opening characteristic, the element body 15 comprises two element portions, a first element portion 20 and a second element portion 21, which are arranged in series in the direction of a longitudinal axis 22 of the element body 15. The first element portion 20 is firmly connected with the base plate 13 and is arranged between the second element portion 21 and the base plate 13. The second element portion 21 is also firmly connected with the first element portion 20. The second element portion 21 comprises a top surface 23 of the valve 9', which is formed facing away from the first element portion 20.

Figure 11:
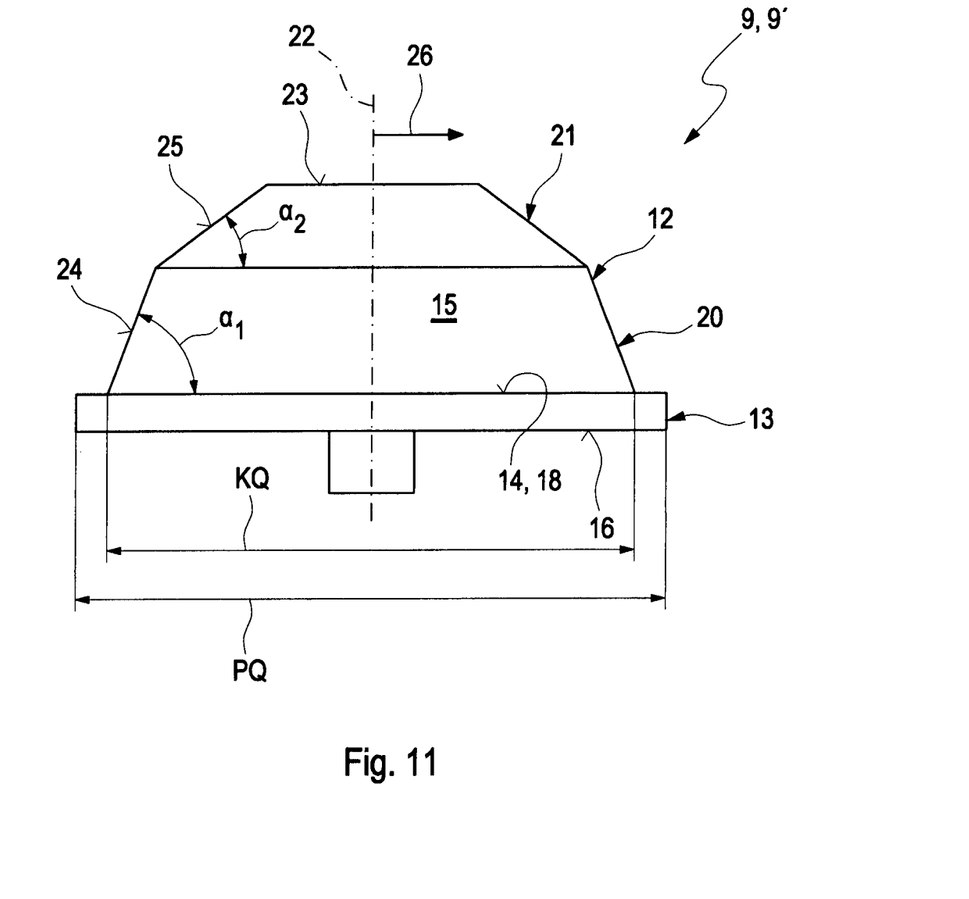
FIG. 11 shows the wastegate of the inventive exhaust gas guide section in a basic representation.

FIG. 11 shows the valve 9' in a principal representation. The first element portion 20 and the second element portion 21 comprise essentially inclined outer surfaces 24, 25 starting from the base plate 13 towards the top surface 23 in the direction of the longitudinal axis 22. A first angle of inclination α1 of the first outer surface 24 of the first element portion 20 is greater than a second angle of inclination α2 of the second outer surface 25 of the second element portion 21.

In a first variant of the wastegate 9 or of the valve 9', respectively, according to FIGS. 1 to 4, 6, both the body basic cross section KQ and the plate cross section PQ have an oval shape. The element body 15 comprises a groove 28 with a width BR, which is formed extending across the top surface 23 over its circumference along a transverse axis 26. In order to reliably seal the first spiral channel 4 and the second spiral channel 5 in the first position, a second channel wall 29 opposite the first channel wall 19 comprises a projection 30 which is formed to complement the groove.

Figure 7:
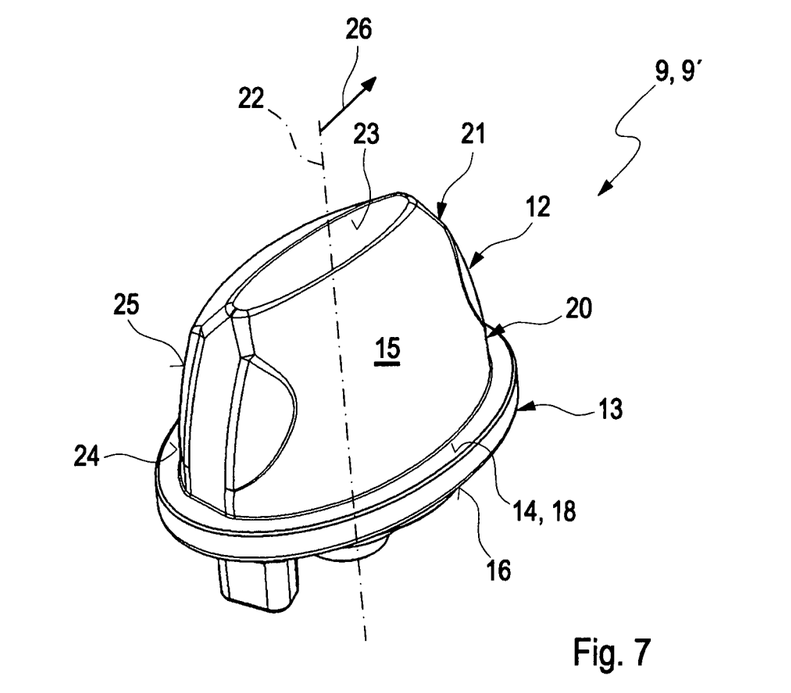
FIG. 7 shows in a perspective view the wastegate of the inventive exhaust gas guide section in a second variant.
Figure 8:
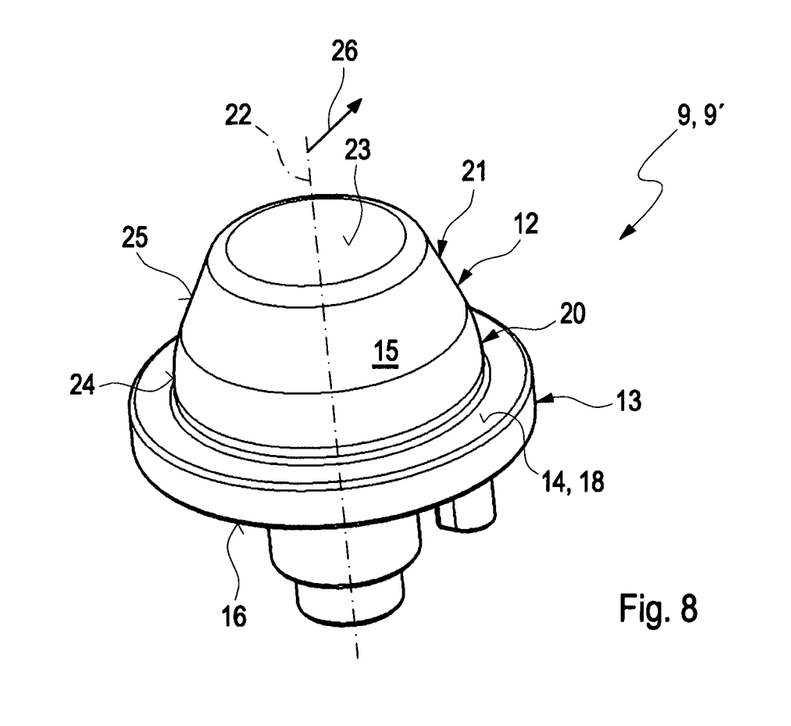
FIG. 8 shows in a perspective view the wastegate of the inventive exhaust gas guide section in a third variant.
Figure 9:
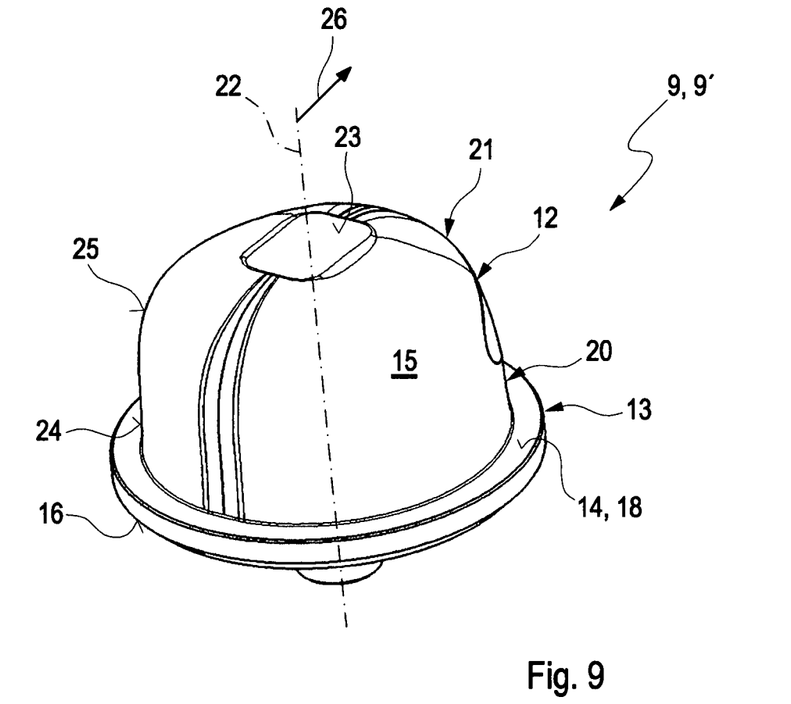
FIG. 9 shows in a perspective view the wastegate of the inventive exhaust gas guide section in a fourth variant.

In a second variant according to FIG. 7, the top surface 23 of the valve 9' has a plane configuration. In a third and a fourth variant according to FIGS. 8 and 9, the valve 9' comprises a circular cross section. In the third variant the second element portion 21 is cone-shaped, while it is configured in the form of spherical layers in the fourth variant.

Figure 10:
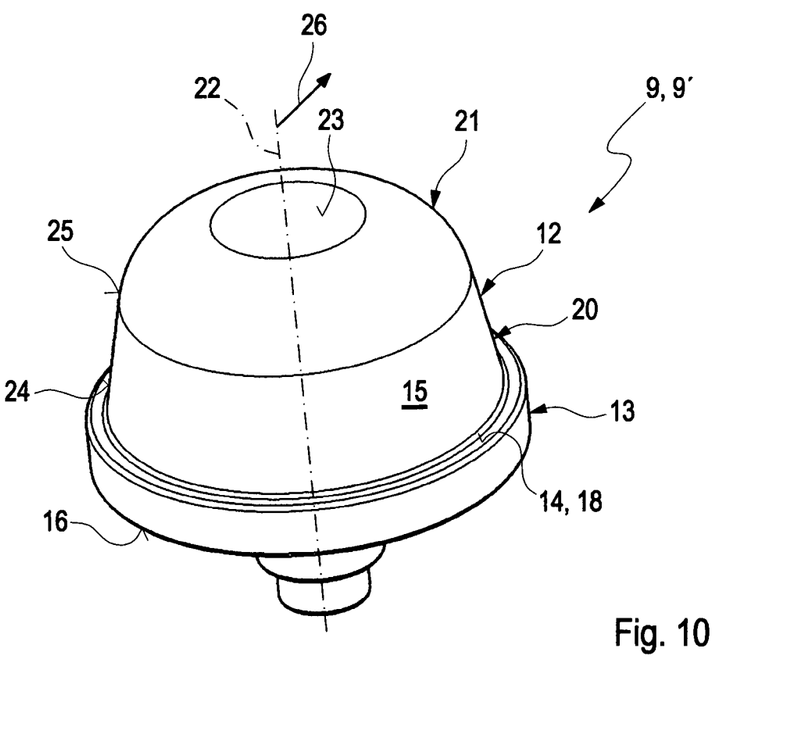
FIG. 10 shows in a perspective view the wastegate of the inventive exhaust gas guide section in a fifth variant.

The fifth variant of the valve 9' shown in FIG. 10 also comprises a pot-shaped outer contour 12, with the top surface 23 being formed rectangular, so that the outer contour 12 of the second element portion 21 has an increased slope in the area of the top surface 23, which differs from the remaining area of the second element portion 21.

In addition, a bypass duct 31 is provided in the through-flow exhaust gas guide section 1 for bypassing the wheel chamber in the exhaust gas guide section 1. The bypass duct 31 comprises an inlet opening 32 with a second flow cross section 33, wherein the inlet opening 32 may be completely or partially closed or completely or partially opened, respectively, by means of the actuator 8 or the wastegate 9, respectively.

The wastegate 9 of the actuator 8, which corresponds to the valve 9', is rotatably accommodated in the bypass duct 31, and thus in the exhaust gas guide section 1, with the wastegate 9 being supported for swivelling about an axis of rotation 34 of the wastegate 9 in the bypass duct 31 and thus in the exhaust gas guide section 1. This means in other words, the wastegate 9 is swivel-mounted in the exhaust gas guide section 1, wherein the second flow cross section 33 of the inlet opening 32 may be adjusted by means of the swivelling motion.

Figure 4:
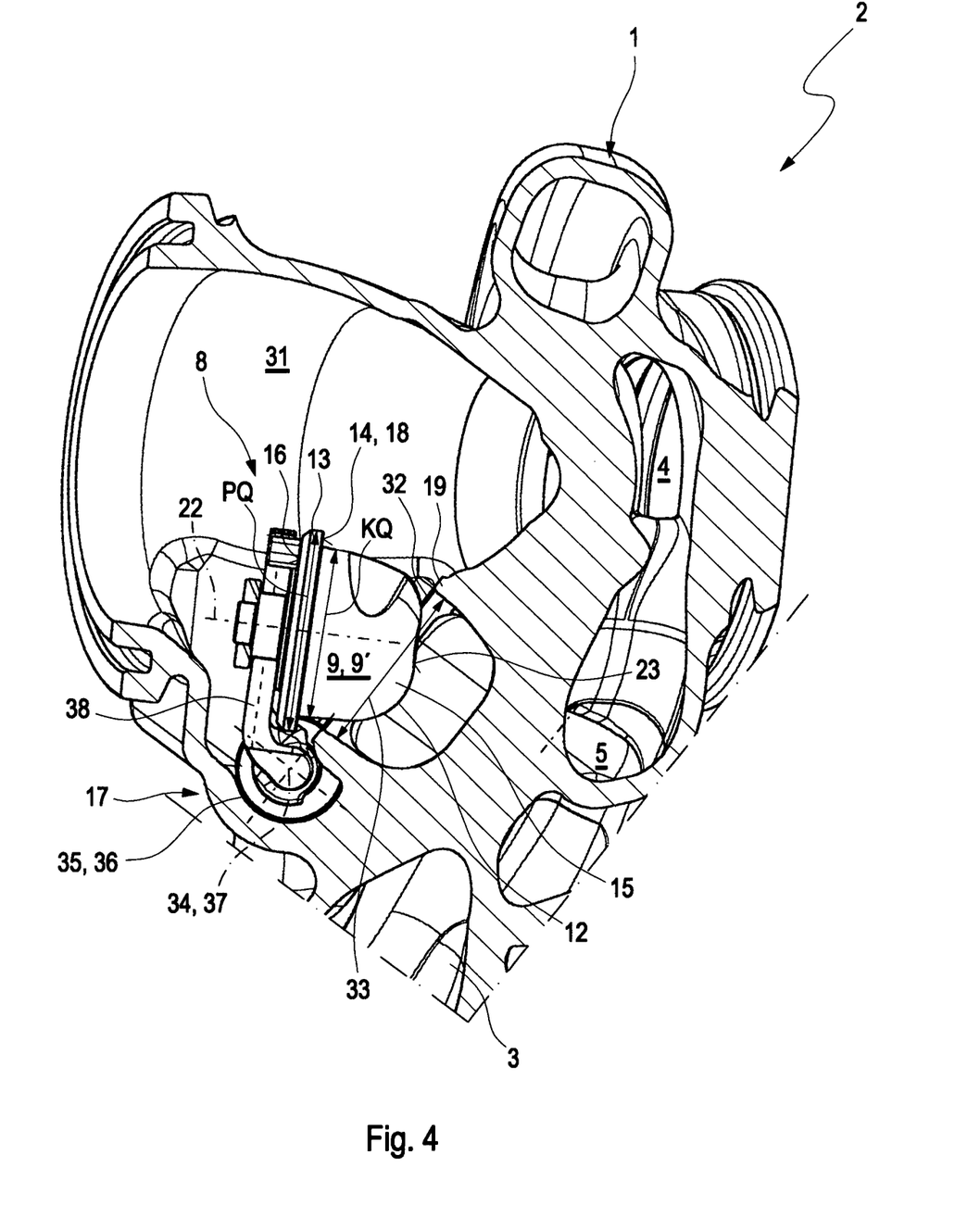
FIG. 4 shows the exhaust gas guide section according to FIG. 3 with the actuator in a second position.

By means of the wastegate 9, a predominantly degressive opening of the second flow cross section 33 may be achieved over a wide opening range, see FIG. 4. Therefore, only a small amount of exhaust gas may be discharged via the second flow cross section 33 into the bypass duct 31 until the first flow cross section 11 is completely open. With the first flow cross section 11 completely open, the second flow cross section 33 is also completely open so that overflow from the first spiral channel 4 into the second spiral channel 5 and vice versa and simultaneously bleeding-off of exhaust gas past the turbine wheel may take place.

To provide movability of the wastegate 9 and thus of the actuator 8, a cylinder-shaped opening 35 is formed in the exhaust gas guide section 1, in which a shaft 36 with a second longitudinal axis 37 of the actuator 8 is rotatably accommodated. A lever arm 38 between the shaft 36 and the wastegate 9 serves to connect the wastegate 9 and the shaft 36 so that the wastegate 9 may be swivelled by a rotation of the shaft 36.

Figure 5:
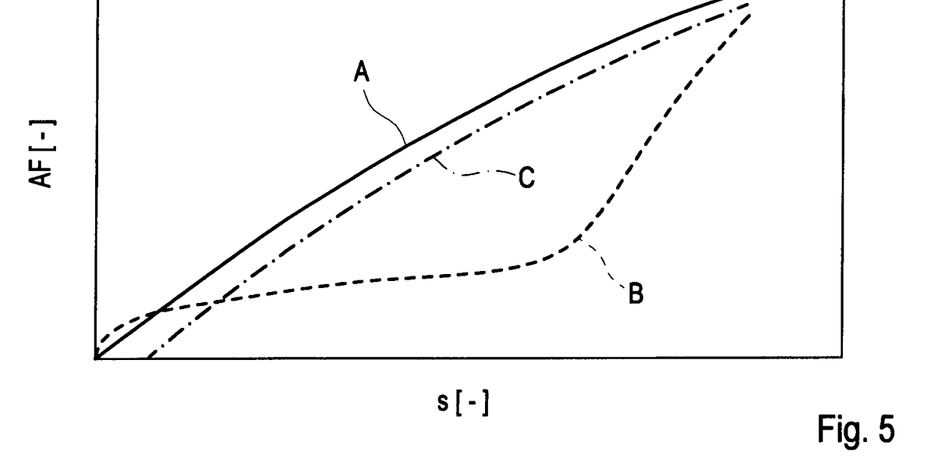
FIG. 5 shows an s-A diagram of an opening characteristic of the inventive exhaust gas turbocharger.
Figure 6:
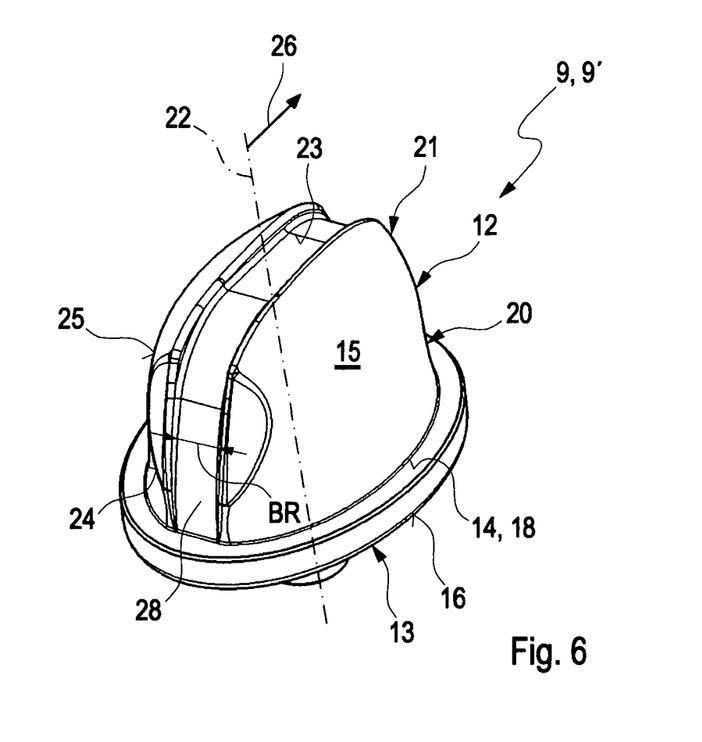
FIG. 6 shows in a perspective view a wastegate of the inventive exhaust gas guide section in a first variant.

FIG. 5 shows an s-A diagram, wherein s denotes a standardized travel of the wastegate 9 or of the valve 9', respectively, and AF denotes a free flow cross section of the flow cross sections 11, 33 depending on the travel s. The travel s is a function of an opening angle of the wastegate 9 or of the valve 9,' respectively, since the valve 9' corresponds to the wastegate 9. The opening angle with a value of 0° corresponds to the closed position of the wastegate 9 or of the valve 9', respectively.

A first line A represents the first flow cross section 11 over the travel s of the valve 9' according to the exemplary embodiment. A second line B represents the free second flow cross section 33 which is variable by means of the wastegate 9. In a variant, a third line C represents the free first flow cross section 11. The courses of the lines A, B, C describe an opening characteristic of the actuator 8.

According to the first line A as well as to the third line C, the actuator 8 exhibits a degressive opening characteristic in relation to the first flow cross section 11. This means in other words that the first flow cross section 11, starting from a closed position of the valve 9', in which the first flow cross section 11 is completely closed, is degressively opened.

According to the course of line B, the actuator 8 exhibits a degressive opening characteristic in relation to the second flow cross section 33. This means in other words that the second flow cross section 33, too, starting from a closed position of the wastegate 9, in which the second flow cross section 33 is completely closed, is degressively opened.

In the variant according to the line C, the first flow cross section 11 is only opened when the second flow cross section 33 has already been partially opened. Preferably, opening of the first flow cross section 11 takes place at an opening angle of approx. 5° of the wastegate 9. Most preferably, the opening angle ranges from 0° to 3°.

In order to prevent overflow of exhaust gas from the first spiral channel 4 into the second spiral channel 5 and vice versa upon opening of the first flow cross section 11 according to line A, the first flow cross section 11 is smaller than the second flow cross section 33 up to a travel s1 of the wastegate 9. If the first flow cross section 11 is opened according to line C, the first flow cross section 11 has to be configured smaller than the second flow cross section 33 up to a travel s1'.

The invention claimed is:

1. An exhaust gas guide section (1) for an exhaust gas turbocharger, comprising:
    a first spiral channel (4) and a second spiral channel (5) formed in the exhaust gas guide section (1),
    the first spiral channel (4) and the second spiral channel (5) being separated from
    a bypass duct (31) by
    a first wall (19) and separated from one another by
    a second wall (29);
    a through-flow opening (10) formed in the second wall (29) between the first spiral channel (4) and the second spiral channel (5); and
    a wastegate (9) for opening and closing the bypass duct (31) of the exhaust gas guide section (1), the wastegate having
    a body (15) firmly connected to
    a base plate (13) for opening and closing
    an inlet opening (32) of the bypass duct (31) in the first wall (19),
    wherein the wastegate (9) has a groove (28) formed along an outer circumference of the body (15), and
    wherein a projection (30) is formed in the second wall (29), the projection (30) being aligned with the body (15) of the wastegate (9) to engage the groove (28) when the wastegate (9) is completely closed, thereby providing a reliable seal between the first spiral channel (4) and the second spiral channel (5),
    wherein, in an intermediate position of the wastegate (9), the through-flow opening (10) is completely closed and the inlet opening (32) of the bypass duct (31) is partially open, and wherein the groove has a width (BR) and extends along a transverse axis (26) across a top surface (23) of the wastegate (9).

2. The exhaust gas guide section according to claim 1, wherein the body (15) has a pot-shaped outer contour (12).

3. The exhaust gas guide section according to claim 1,
    wherein the body (15) of the wastegate (9) comprises a first portion (20) and a second portion (21) along its longitudinal axis (22),
    wherein a first angle of inclination ($\alpha 1$) of a first outer surface 24 of the first portion (20) is greater than a second angle of inclination ($\alpha 2$) of a second outer surface (25) of the second portion (21), and
    wherein the second portion (21) is arranged opposite the second wall (29).

4. The exhaust gas guide section according to claim 3,
    wherein the wastegate (9) comprises an annular surface (18), which bears against the first wall (19) of the exhaust gas guide section (1).

5. The exhaust gas guide section according to claim 4,
    wherein the wastegate (9) is mounted at a lever arm (38) which may be swivelled about an axis of rotation (34), the axis of rotation being arranged in a common plane with the annular surface (18).

6. The exhaust gas guide section according to claim 1, wherein both the base plate (13) and the body (15) have oval cross-sectional shapes.

7. The exhaust gas guide section according to claim 1, wherein the top surface (23) of the groove (28) which faces the projection (30) is flat.

\* \* \* \* \*